(12) United States Patent
Tanioka et al.

(10) Patent No.: US 7,068,395 B1
(45) Date of Patent: Jun. 27, 2006

(54) IMAGE PROCESSING APPARATUS AND METHOD

(75) Inventors: Hiroshi Tanioka, Yokohama (JP); Shoji Takeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/576,928

(22) Filed: May 23, 2000

(30) Foreign Application Priority Data

| May 25, 1999 | (JP) | ............................................ 11-145505 |
| Apr. 12, 2000 | (JP) | ........................................ 2000-111159 |

(51) Int. Cl.
*H04N 1/40* (2006.01)

(52) U.S. Cl. ...................... 358/3.01; 358/3.02; 358/3.09

(58) Field of Classification Search ................ 358/3.01, 358/3.02, 3.06, 3.09, 3.1, 3.27; 382/266, 382/296, 297, 299
See application file for complete search history.

(56) References Cited

U.S. PATENT DOCUMENTS

| 5,760,918 A | 6/1998 | Tanioka et al. ............. 358/445 |
| 5,825,940 A | 10/1998 | Yamagata et al. .......... 382/276 |
| 6,011,878 A * | 1/2000 | Ushida et al. ............... 382/298 |
| 6,118,547 A | 9/2000 | Tanioka ...................... 358/1.9 |
| 6,134,355 A | 10/2000 | Yamada et al. ............. 382/272 |

FOREIGN PATENT DOCUMENTS

| JP | 63-182973 | 7/1988 |
| JP | 4-200078 | 7/1992 |
| JP | 5-284339 | 10/1993 |
| JP | 5-292297 | 11/1993 |
| JP | 8-065511 | 3/1996 |
| JP | 10-023259 | 1/1998 |

* cited by examiner

*Primary Examiner*—Thomas D. Lee
(74) *Attorney, Agent, or Firm*—Fitzpatrick, Cella, Harper & Scinto

(57) ABSTRACT

Multivalued image information is input, subjected to multivalued processing, and converted into data representing the number of print dots for each pixel. Print dots are counted for each region made up of a plurality of pixels, and a print dot layout in a region of interest is determined in accordance with the count value of print dots in a peripheral region around the region of interest. This arrangement can provide an image processing apparatus and method capable of obtaining a high-quality image without increasing the amount of information.

8 Claims, 7 Drawing Sheets

FIG. 3

| PATTERN NUMBER | DATA ABOUT THE NUMBER OF BLACK DOTS | | | PRINTING PATTERN A |
|---|---|---|---|---|
| | B | A | C | |
| 0 | 0 | 0 | 0 | ○○○○○○ |
| ∫ | | | | |
| 7 | 0 | 1 | 0 | ○○○◉○○ |
| ∫ | | | | |
| 10 | 0 | 1 | 3 | ○○○○◉○ |
| ∫ | | | | |
| 13 | 0 | 1 | 6 | ○○○○○◉ |
| ∫ | | | | |
| | 0 | 2 | 1 | ○○◉◉○○ |
| | 0 | 2 | 6 | ○○○○◉◉ |
| | 0 | 2 | 4 | ○○○◉◉○ |
| | 3 | 2 | 4 | ○○◉◉○○ |
| ∫ | | | | |
| | 0 | 3 | 0 | ○○◉◉◉○ |
| | 0 | 3 | 6 | ○○○◉◉◉ |
| | 4 | 3 | 6 | ○○◉◉◉○ |
| | 4 | 3 | 0 | ○◉◉◉○○ |
| ∫ | | | | |
| 314 | 6 | 2 | 6 | ◉○○○○◉ |
| ∫ | | | | |
| 321 | 6 | 3 | 6 | ◉◉○○○◉ |
| ∫ | | | | |
| 335 | 6 | 5 | 6 | ○◉◉◉◉◉ |
| ∫ | | | | |
| 342 | 6 | 6 | 6 | ◉◉◉◉◉◉ |

FIG. 4A

| A00 | A01 | A02 | A10 | A11 | A12 | A20 | A21 | A22 |
|-----|-----|-----|-----|-----|-----|-----|-----|-----|
| B00 | B01 | B02 | B10 | B11 | B12 | B20 | B21 | B22 |
| C00 | C01 | C02 | C10 | C11 | C12 | C20 | C21 | C22 |
| D00 | D01 | D02 | D10 | D11 | D12 | D20 | D21 | D22 |
| E00 | E01 | E02 | E10 | E11 | E12 | E20 | E21 | E22 |
| F00 | F01 | F02 | F10 | F11 | F12 | F20 | F21 | F22 |

FIG. 4B (ROTATE 180°)

| F22 | F21 | F20 | F12 | F11 | F10 | F02 | F01 | F00 |
|-----|-----|-----|-----|-----|-----|-----|-----|-----|
| E22 | E21 | E20 | E12 | E11 | E10 | E02 | E01 | E00 |
| D22 | D21 | D20 | D12 | D11 | D10 | D02 | D01 | D00 |
| C22 | C21 | C20 | C12 | C11 | C10 | C02 | C01 | C00 |
| B22 | B21 | B20 | B12 | B11 | B10 | B02 | B01 | B00 |
| A22 | A21 | A20 | A12 | A11 | A10 | A02 | A01 | A00 |

FIG. 4C (ROTATE −90°)

| A22 | B22 | C22 | D22 | E22 | F22 |
|-----|-----|-----|-----|-----|-----|
| A21 | B21 | C21 | D21 | E21 | F21 |
| A20 | B20 | C20 | D20 | E20 | F20 |
| A12 | B12 | C12 | D12 | E12 | F12 |
| A11 | B11 | C11 | D11 | E11 | F11 |
| A10 | B10 | C10 | D10 | E10 | F10 |
| A02 | B02 | C02 | D02 | E02 | F02 |
| A01 | B01 | C01 | D01 | E01 | F01 |
| A00 | B00 | C00 | D00 | E00 | F00 |

FIG. 4D (ROTATE 90°)

| F00 | E00 | D00 | C00 | B00 | A00 |
|-----|-----|-----|-----|-----|-----|
| F01 | E01 | D01 | C01 | B01 | A01 |
| F02 | E02 | D02 | C02 | B02 | A02 |
| F10 | E10 | D10 | C10 | B10 | A10 |
| F11 | E11 | D11 | C11 | B11 | A11 |
| F12 | E12 | D12 | C12 | B12 | A12 |
| F20 | E20 | D20 | C20 | B20 | A20 |
| F21 | E21 | D21 | C21 | B21 | A21 |
| F22 | E22 | D22 | C22 | B22 | A22 |

IMAGE PROCESSING APPARATUS AND METHOD

FIELD OF THE INVENTION

The present invention relates to an image processing apparatus and method for converting input multivalued image data into binary image data.

BACKGROUND OF THE INVENTION

As a conventional image processing method of this type, a binarization method based on error diffusion is generally adopted which can express substantially both sharpness and tone for an image including a halftone image and a thin character line. If the print dot density is raised to 600 DPI or more, the character sharpness improves and the dot graininess of the halftone part is reduced. If the printing density is reduced to 400 DPI, high-quality tone reproduction can be obtained by continuous pulsewidth modulation of 256 gray levels.

In some cases, a printer for printing characters divides one dot of 600 DPI into two dots in the main scanning direction, i.e., prints minimum print dots at 1,200×600 DPI. At this time, correction dots for smoothening a curve part are generated from font data of 600×600 DPI to enable smoother printing at higher resolution.

If ternary processing is performed for each pixel at a printing density of, e.g., 600×600 DPI using similar print dots and multivalued error diffusion, printing by 7-valued pulsewidth modulation is locally realized at a printing density of 200 DPI. This provides an image corresponding to continuous pulsewidth modulation of 256 gray levels at about 200 DPI.

However, compared to binary printing at 600 DPI, the amount of information required for printing using 256 gray levels for 8-bit pixels at a printing density 400 DPI increases by:

$$(400 \times 400 \times 8)/(600 \times 600 \times 1) = 32/9 = 3.56 \text{ times}$$

The amount of information required for printing at 1,200×600 DPI obtained by dividing one dot of 600 DPI into two increases by:

$$(1,200 \times 600 \times 1)/(600 \times 600 \times 1) = 2 \text{ times}$$

In digital PWM (Pulsewidth Modulation) printing using ternary error diffusion processing for respective pixels of 600×600 DPI, the number of printing patterns as processing results is $3^3 = 27$ (5 bits) at a printing density of 200×600 DPI. This amount of information corresponds to 600×600×1.67 bits, which is 1.67 times the amount of information of 600×600 DPI. The increase in the amount of information causes an increase in the cost for storing/transmitting information.

SUMMARY OF THE INVENTION

The present invention has been made to overcome the conventional drawbacks, and has as its object to provide an image processing apparatus and method capable of obtaining a high-quality image printout without increasing the amount of information.

It is another object of the present invention to provide an image processing apparatus and method for counting black dots for each region made up of a plurality of pixels, and determining the dot layout in a region of interest in accordance with the count value of black dots in the peripheral region.

It is still another object of the present invention to provide an image processing apparatus and method capable of rotating an image stored in memory even when black dots are counted for each region made up of a plurality of pixels, and the count value is stored as image information in the memory.

Thus, in one aspect, the invention is an image processing apparatus, comprising input means for inputting multivalued image information, conversion means for performing multivalued processing on the input multivalued image information and converting the information into data representing a number of print dots for each pixel, counting means for counting the number of print dots for each region made up of a plurality of pixels, and print dot layout determination means for determining a print dot layout in a region of interest in accordance with a count value of print dots in peripheral region around the region of interest.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a table showing the contents of a ROM included in the printing pattern generator in FIG. 2;

FIGS. 4A to 4D are views for explaining image processing accompanying image rotation processing of an image processing apparatus according to the second embodiment of the present invention;

DETAILED DESCRIPTION OF THE PREFERRED EMBODIMENTS

Preferred embodiments of the present invention will be exemplified in detail below with reference to the accompanying drawings. The relative arrangements, formulas, and numerical values of building components described in these embodiments do not limit the spirit and scope of the present invention, unless otherwise specified.

First Embodiment

A conventional image processing apparatus on which the present invention is based will be described before a description of the first embodiment according to the present invention.

<Conventional Image Processing Apparatus>

Figure 6:
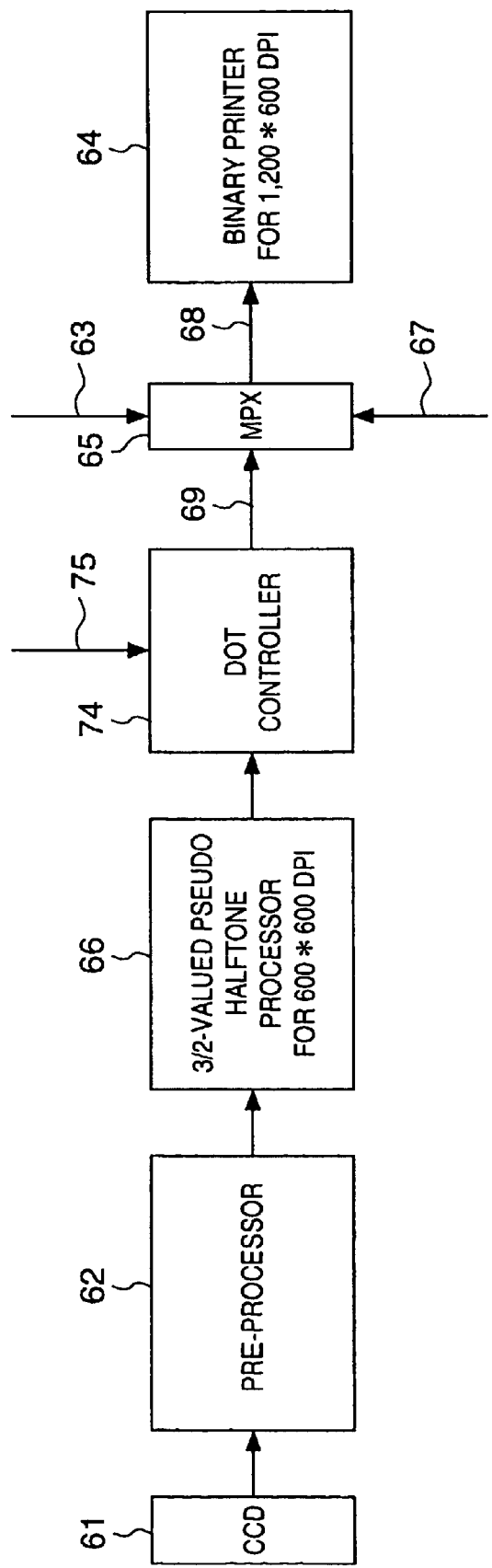
FIG. 6 is a block diagram showing an image processing apparatus on which the present invention is premised.

FIG. 6 is a block diagram showing the components of an image processing apparatus. Reference numeral 61 denotes a CCD for reading an image at a density of 600 DPI in the main scanning direction and at a density of 600 DPI in the subscanning direction; and 64, a printer for printing image information on a printing sheet at a predetermined resolution after the image information input by the CCD 61 is processed. The printer 64 can print image information at 1,200×600 DPI.

Reference numeral 62 denotes a pre-processor for converting analog signals from the CCD 61 into digital signals by an A/D converter, and performing shading correction and luminance/density conversion. If necessary, the pre-processor 62 executes pre-processing using a spatial filter. This pre-processor outputs 8-bit data for one pixel. numeral 66 denotes a pseudo halftone processor which can implement all common multivalued and binary error diffusion methods and their improvements.

The pseudo halftone processor 66 can process multivalued 8-bit data of one pixel having 256 levels into binary or ternary data in accordance with an operator's input. For ternary or three-valued data, pixels at 600 DPI in the main scanning direction are re-quantized into values of 0 (white), 1 (gray), and 2 (black). This data represent the number of print dots. Reference numeral 74 denotes a dot controller for converting ternary image signals into a print dot layout corresponding to the resolution of the printer 64 in the main scanning direction simultaneously for three pixels; and 65, a selector for supplying an external printing signal 63 (not described in detail) and a printing signal 69 of the first embodiment to the printer 64. These signals are switched by a signal 67.

Figure 7:
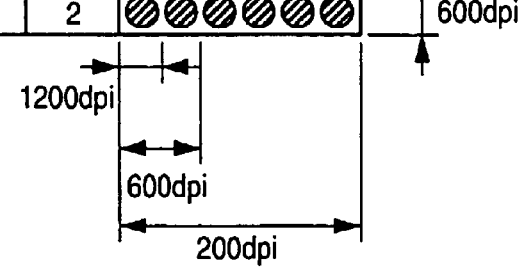
FIG. 7 is a table showing the contents of a ROM included in the printing pattern generator of the image processing apparatus on which the present invention is premised.

FIG. 7 is a table for explaining processing in the dot controller 74.

FIG. 7 shows a correspondence table of ternary data of three pixels 3$n$, 3$n$+1, and 3$n$+2 successive in the main scanning direction, and printing using print dots of 1,200× 600 DPI; it shows some of the 27 printable patterns.

For example, the sum of multivalued data of three pixels is 4 for each of pattern numbers 20, 21, and 22 in the table, and each printing pattern has four print dots (●). The number of print dots in each pattern is always the same value as the sum of original ternary data. Thus, the printing density can be preserved to stably express the density, and resolution information of an original can also be preserved and printed. This is advantageous particularly in reproducing an original including both a silver halide photographic image and a character image. Since ternary data of three pixels can only take 3×3×3=27 patterns, the number of corresponding printing patterns is also 27 at maximum. Information of three pixels is 200×600×5 bits (600×600×1.67 bits) This amount of information is larger than in a conventional binary error diffusion mode for 600×600 DPI, and the memory capacity for storing information increases.

However, considering the number of print dots, only 7 types of information 0 to 6 are stored. If only the number of print dots is stored, and the print dot layout is derived from the number of print dots for 6 preceding or subsequent dots, the amount of information decreases to 200×600×3 bits= 600×600×1 bit. That is, information can be processed with the same amount of information as in the conventional binary error diffusion mode.

<Image Processing Apparatus According to First Embodiment>

The first embodiment uses the number of print dots as printing information for storage, transmission, and processing, and estimates dot position information from the number of print dots at adjacent pixels.

Figure 1:
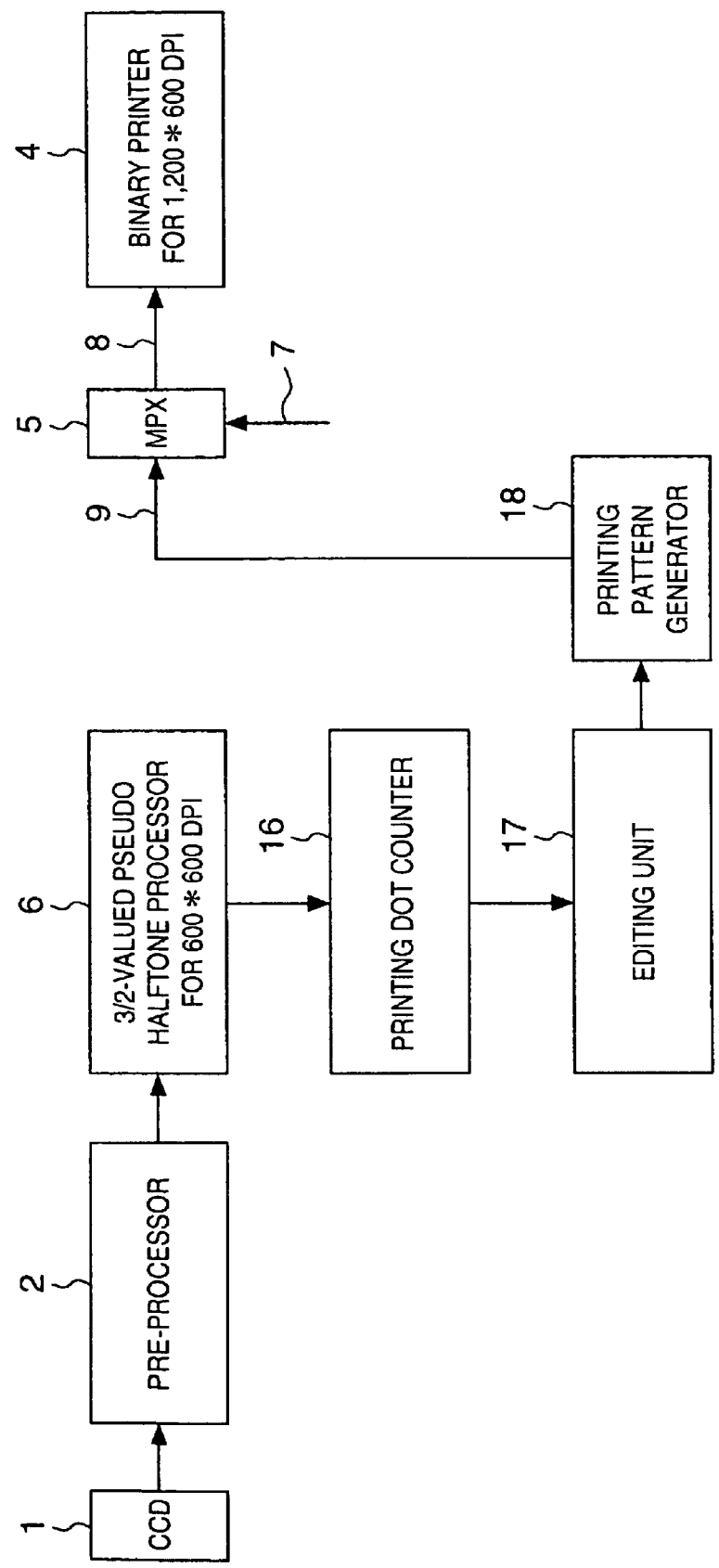
FIG. 1 is a block diagram showing an image processing apparatus according to the first embodiment of the present invention.

FIG. 1 is a block diagram shows an image processing apparatus according to the first embodiment. Only the difference from FIG. 6 will be explained.

Pixels of 600 DPI in the main scanning direction are re-quantized into values of 0 (white), 1 (gray), and 2 (black) by a pseudo halftone processor 6, and inputted to a print dot counter 16. The print dot counter 16 adds the multivalued data of three pixels in the main scanning direction to obtain 3-bit data, and input the data as a serial signal to an image editing unit 17 as if the 3-bit data were data of 600×600×1 bit. The image editing unit 17 has an image memory and internally executes compression/expansion processing such as JBIG. If necessary, the image editing unit 17 may rotate the image data temporarily stored in the image memory. An image signal output from the image editing unit 17 is converted by a printing pattern generator 18 into a pattern to be actually printed.

Figure 2:
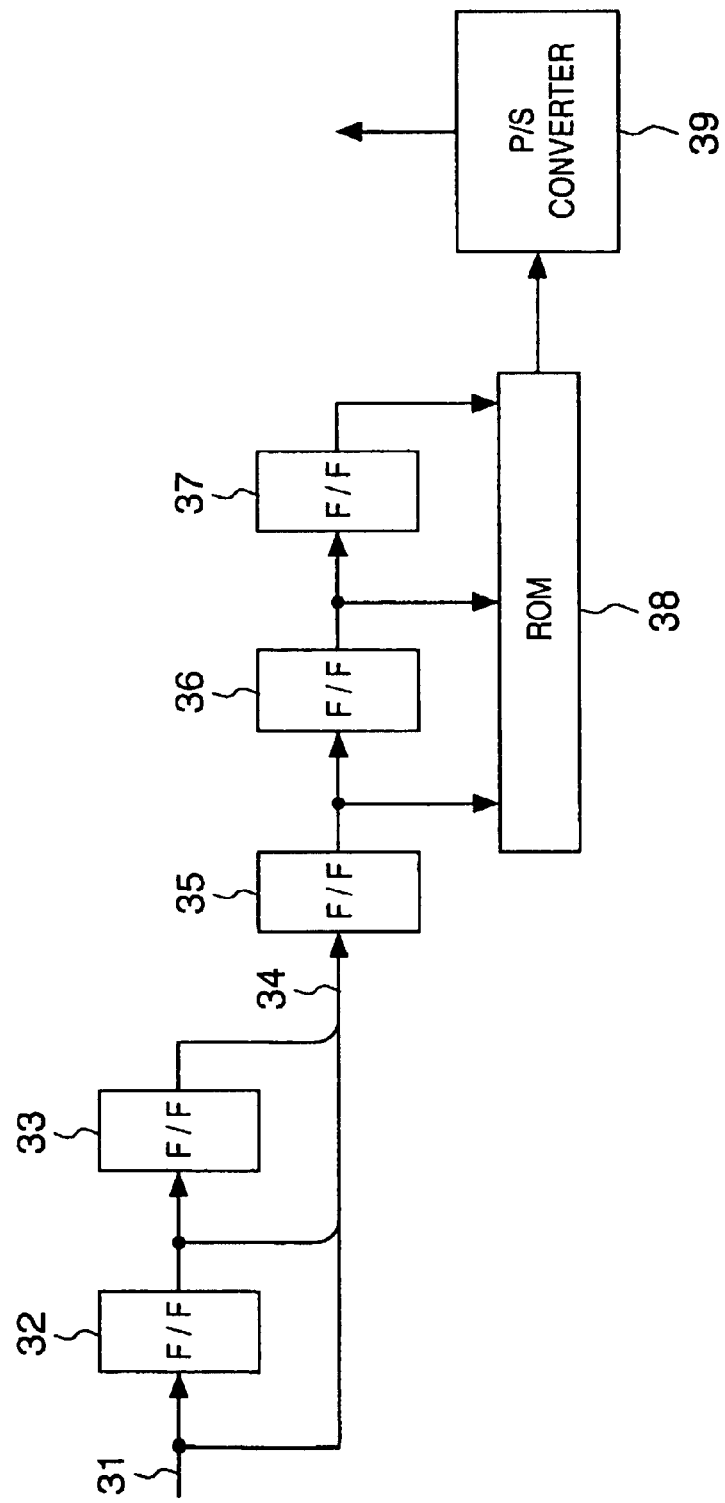
FIG. 2 is a block diagram showing a printing pattern generator 18 in the image processing apparatus according to the first embodiment.

FIG. 2 shows the internal arrangement of the printing pattern generator 18.

An output 31 from the image editing unit 17 is a 1-bit serial signal, and successive 3 bits represent the number of print dots. As shown in FIG. 2, the output 31 is delayed and held by pixel clocks (not shown) of 600 DPI using 1-bit F/Fs 32 and 33 to obtain 3-bit black dot information 34. The black dot information 34 is delayed and held by clocks whose frequency is divided by 3 using 3-bit F/Fs 35, 36, and 37. An output from the F/F 36 is used as a pattern of interest, and the numbers of black dots on two patterns adjacent in the main scanning direction can be simultaneously referred. Data on the numbers of black dots representative as three patterns are input to a 512-byte ROM 38 through nine address lines, and converted into a printing pattern using an LUT stored in the ROM 38. The printing pattern output from the ROM 38 is input to a parallel/serial converter (P/S converter) 39 as a 6-bit signal corresponding to 6 print dot positions. The parallel/serial converter 39 outputs, to the printer, a 1-bit serial signal of 1,200×600 DPI or a 2-bit serial signal of 600×600 DPI.

A method of preparing an LUT to be stored in the ROM 38 will be explained. Let A be the number of black dots out of 6 dots at a position of interest, B be the number of dots out of 6 dots at a preceding position, and C be the number of dots out of 6 dots at a subsequent position (A, B, and C take values of 0 to 6), a first derivative L is defined as $$L=(C-A)-(B-A)=C-B$$

In accordance with this value, the central printing position of black dots at the position of interest is determined. For example, for B=0, A=2, and C=6; L=6, and the center of two black dots is shifted to the C side. For B=6, A=2, and C=0; L−6, and the center of two black dots is shifted to the B side. For B=6, A=2, and C=6; L=0, and the center of two black dots is set at the center of the printing region.

More specifically, the printing position is shifted in the blacker direction by evaluating the number of left and right black dots. This can prevent blur at character edges. If the density hardly changes, dots are concentrated and printed at the center, and a vertical screen corresponding to 200 DPI with stable halftone can be formed. Note that patterns corresponding to 343 (=7×7×7) combinations are prepared in the LUT in advance in accordance with basically the above method.

FIG. 3 shows part of the LUT according to the first embodiment. In FIG. 3, both B and C are 6 on patterns 314, 321, and 335, and dots are to be positioned at the center in the above method. However, it is experimentally confirmed that the resolution increases when dots are distributed to the right and left for a low density A, like the patterns 314 and 321. For this reason, dots are laid out as shown in FIG. 3. In this manner, the pattern may be experimentally determined.

As described above, the first embodiment can derive a high-quality dot layout which satisfies both sharpness and tone with a small amount of information (three 3-bit pixels).

Patterns not provided with pattern numbers in FIG. 3 comprehensively represent how the printing pattern changes depending on a difference in the numbers B and C of black dots when the number A of black dots takes values of 2 and 3. For this purpose, the patterns are out of order.

Second Embodiment

The second embodiment of the present invention will be described.

An image processing apparatus according to the second embodiment has the same arrangement as in FIG. 1, but is different from the first embodiment in that an image editing unit 17 has a special configuration. With the different configuration of the image editing unit 17, the configuration of a black dot counter 16 is also different from that in FIG. 1. The configuration of the black dot counter 16 will be explained with reference to FIGS. 4A to 4D and 5, and a description of the remaining configuration will be omitted.

In the second embodiment, when a read address from the internal memory of the image editing unit 17 is controlled to rotate an image, the black dot counter 16 counts print dots in a region corresponding to the rotational angle in advance.

FIG. 4A shows a state in which the number of black dots is stored by 3 bits in the above-described region of 200×600 DPI for printing an image having each 1-bit mesh of 600×600 DPI. The number of black dots in one region A0 encircled elliptically is represented as 1×A00+2×A01+4×A02 by three pieces of 1-bit information A00, A01, and A02 (for example, the number of black dots is 5 for A00=1, A01=0, and A02=1). These pieces of 1-bit information are generally directly read out in the lateral direction of a sheet surface, converted into a printing pattern by a printing pattern generator 18, and printed by a printer 4.

When an image is rotated through 180°, as shown in FIG. 4B, readout data are processed every 3 bits, and the number of print dots in a region F2 must be 1×F22+2×F21+4×F20, which is different from 1×F20+2×F21+4×F22 when the image is not rotated. Hence, the black dot counter 16 of the present invention reverses the LSB (Least Significant Bit) and MSB (Most Significant Bit) of the dot count value, in advance, and outputs the obtained data when the rotational angle of the image is 180°.

FIG. 4C shows an example when the image in FIG. 4A is rotated through −90°. Also in this case, the number of print dots must be 1×A21+2×B21+4×C21, which is different from a value when the image is not rotated. In counting print dots, multivalued signals for three pixels must be counted not in the main scanning direction but in the subscanning direction.

A print dot counting means corresponding to rotation processing will be described in detail with reference to FIG. 5.

Figure 5:
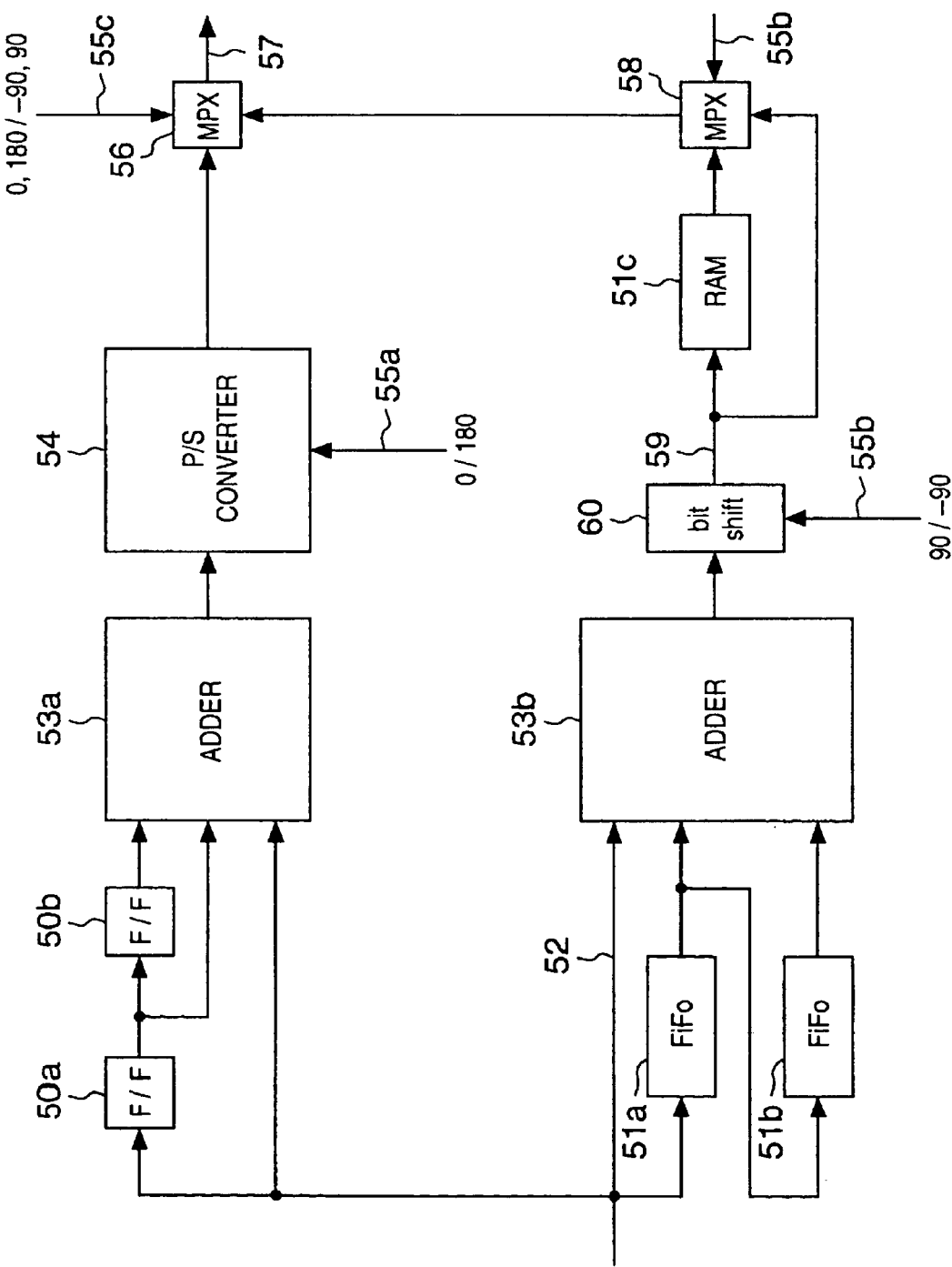
FIG. 5 is a block diagram showing a print dot counter in the image processing apparatus according to the second embodiment of the present invention.

FIG. 5 is a block diagram showing the internal arrangement of the print dot counter 16 according to the second embodiment.

A case when an image is rotated through 0° and 180° will be described. Ternary image signals 52 are delayed and held in units of pixels using 2-bit F/Fs 50a and 50b, and image data of three pixels are added by an adder 53a. That is, data are added every three pixels. An output from the adder is obtained as a 3-bit print dot count value of 0 to 6. In converting the parallel signal into a serial signal depending on whether the rotational angle is 0° or 180°, a parallel/serial converter 54 converts the parallel signal into a serial signal from either the LSB or MSB of the 3-bit signal in accordance with a selection signal 55a. The converted signal is selected by a selection signal 55c of a selector 56, and input to the memory of the image editing unit 17 as a 1-bit signal 57 of 600×600 DPI.

When the rotational angle is 90° or −90°, ternary signals are delayed and held in units of lines using Fifos 51a and 51b, and data of three pixels successively having the same main scanning address are simultaneously added by an adder 53b. The adder adds data every three lines. As described above, an output from the adder is obtained as a 3-bit print dot count value which can take a value of 0 to 6 in accordance with a multivalued data value. A bit shifter 60 reverses the LSB and MSB of the 3-bit signal by a selection signal 55b depending on whether the rotational angle is 90° or −90°. Of printing signal count value data 59 obtained for each pixel in the main scanning direction, 1-bit LSB (MSB) serial data is selected by a selector 58 and the selector 56, and output as the 1-bit signal 57 of 600×600 DPI to the memory of the image editing unit 17 for one scanning.

At the same time, the remaining 2-bit data of the print dot count value data 59 are stored in a RAM 51c. In the next main scanning, data of the second bit stored in the RAM 51c is output for one scanning.

That is, the selector 58 selects the first bit of the print dot count value 59 for the first line, and selects 1-bit data stored in the RAM 51c for both the second and third lines under the control of a selection signal 55d.

As described above, when a 7-valued printing signal count value of 200 DPI is stored as a 3-bit signal in a memory as if the 3-bit signal were a signal of 600×600×1 bit, bit layout processing and addition processing in both the main and sub scan directions of a multivalued signal are executed, in advance, in accordance with a subsequent rotational angle. Therefore, even if an image is rotated and output from the memory, it is possible to get an effect of the above first embodiment.

Other Embodiment

The present invention may be applied to a system constituted by a plurality of devices (e.g., a host computer, interface device, reader, and printer) or an apparatus comprising a single device (e.g., a copying machine or facsimile apparatus).

The object of the present invention is realized even by supplying a storage medium storing software program codes for realizing the functions of the above-described embodiments to a system or apparatus, and causing the computer (or a CPU or MPU) of the system or apparatus to read out and execute the program codes stored in the storage medium.

In this case, the program codes readout from the storage medium realize the functions of the above-described embodiments by themselves, and the storage medium storing the program codes constitutes the present invention.

As a storage medium for supplying the program codes, a floppy disk, hard disk, optical disk, magnetooptical disk, CD-ROM, CD-R, magnetic tape, nonvolatile memory card, ROM, or the like can be used.

The functions of the above-described embodiments are realized not only when the readout program codes are executed by the computer but also when the NOS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the embodiments, information of 200×600 DPI×3 bits (7-valued) is stored in an image memory assuming 600×600 DPI×1 bit, so that a high-quality image can be obtained with a small amount of information. According to the embodiments, when an image signal stored in a memory at 200×600 DPI×3 bits is rotated on the memory, the signal can be rotated as an image signal of 600×600 DPI×1 bit, and the rotated image signal can be printed as an image signal of 200×600 DPI×3 bits.

The above embodiments have exemplified the case in which information of 200×600 DPI×3 bits is stored in an image memory assuming 600×600 DPI×1 bit. However, the present invention is not limited to this resolution, and can also be applied to a case in which information of 400×1,200 DPI×3 bits is stored in an image memory assuming 1,200× 1,200 DPI×1 bit.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus, comprising:

input means for inputting multivalued image information;

conversion means for converting the input multivalued image information into first data representing a number of print dots for each pixel of the image;

generation means for generating second data representing the total number of print dots in each region made up of a plurality of pixels, based on the first data;

a memory for storing the second data generated by said generation means; and print dot layout determination means for inputting from said memory a plurality of the second data comprising the second data of a region of interest and the second data of at least one region around the region of interest, and determining a print dot layout in the region of interest in accordance with the plurality of the second data;

wherein said print dot layout determination means concentrates dots of the print dot layout in the region of interst at the center of the region in a case where the total numbers of print dots in the regions around the region of interest are small and the total number of dots in the region of interest is small, distributes dots of the print dot layout to the right and left sides in the region of interest in a case where the total numbers of print dots in the regions around the region of interest are large and the total number of dots in the region of interest is small, and shifts dots of the print dot layout in the region of interest to a region around the region of interest, which has more large number of dots than the other region around the region of interest in a case where a difference between the total numbers of print dots in the regions around the region of interest is large.

2. The apparatus according to claim 1, wherein, when the image is to be rotated, said generation means generates the second data for print dots for each of different regions in accordance with a rotational angle, before the rotation.

3. The apparatus according to claim 2, wherein said generation means comprises:

first generation means for generating the second data in a region made up of a predetermined number of successive pixels in a main scanning direction; and second generation means for generating the second data in a region made up of a predetermined number of successive pixels in a subcanning direction, and said generation means outputs:

when an image is not rotated, the second data generated by said first generation means, directly, when an image is rotated through 180°, the second data generated by said first generation means, in an inverse bit order, when an image is rotated through 90°, the second data generated by said second generation means, directly, and when an image is rotated through 270°, the second data generated by said second generation means, in an inverse bit order.

4. The apparatus according to claim 1, further comprising image printing means for printing an image on a printing medium in accordance with the print dot layout output from said print dot layout determination means.

5. An image processing method, comprising the steps of:

an input step of inputting multivalued image information;

a conversion step of converting the input multivalued image information into first data representing the number of print dots for each pixel of the image;

a generation step of generating second data representing the total number of print dots in each region made up of a plurality of pixels, based on the first data;

a memorizing step of storing the second data generated by said generation means in a memory; and a print dot layout determination step of inputting from said memory a plurality of the second data comprising the second data of a region of interest and the second data of a least one region around the region of interest, and determining a print dot layout in the region of interest in accordance with the plurality of the second data, wherein said print dot layout determination step concentrates dots of the print dot layout in the region of interest at the center of the region in a case where the total numbers of print dots in the regions around the region of interest are small and the total number of dots in the region of interest is small, distributes dots of the print dot layout to the right and left sides in the region of interest in a case where the total numbers of print dots in the regions around the region of interest are large and the total number of dots in the region of interest is small and shifts dots of the print dot layout in the region of interest to a region around the region of interest, which has more large number of dots than the other region around the region of interest in a case where a difference between the total numbers of print dots in the regions around the region of interest is large.

6. The image processing method according to claim 5, wherein, when the image is to be rotated, the generating step generates the second data for print dots for each of different regions in accordance with a rotational angle, before the rotation.

7. The method according to claim 6, wherein the generation step comprises:

a first generation step of generating the second data in a region made up of a predetermined number of successive pixels in a main scanning direction; and a second generation step of generating the second data in a region made up of a predetermined number of successive pixels in a subscanning direction, and said generating step outputs, when an image is not rotated, the second data generated in the first generation step, directly, when an image is rotated through 180°, the second data generated in the first generation step, in an inverse bit order, when an image is rotated through 90°, the second data generated in the second generation step, directly, and when an image is rotated through 270°, the second data generated in the second generation step, in an inverse bit order.

8. A computer-readable storage medium which stores a computer readable program for an image processing method, the program comprising the steps of:

an input step of inputting multivalued image information;

a conversion step of converting the input multivalued image information into first data representing the number of print dots for each pixel of the image;

a generation step of generating second data representing the total number of print dots in each region made up of a plurality of pixels, based on the first data;

a memorizing step of storing the second data generated by said generating step in a memory; and a print dot layout determination step of inputting from the memory a plurality of the second data, comprising the second data of a region of interest and the second data of at least one region around the region of interest, and determining a print dot layout in the region of interest in accordance with the plurality of the second data, wherein said print dot layout determination step concentrates dots of the print dot layout in the region of interest at the center of the region in a case where the total number of print dots in the regions around the region of interest are small and the total number of dots in the region of interest is small, distributes dots of the print dot layout to the right and left sides in the region of interest in a case where the total numbers of print dots in the regions around the region of interest are large and the total number of dots in the region of interest is small, and shifts dots of the print dot layout in the region of interest to a region around the region of interest, which has more large number of dots than the other region around the region of interest in a case where a difference between the total numbers of print dots in the regions around the region of interest is large.

* * * * *

UNITED STATES PATENT AND TRADEMARK OFFICE
CERTIFICATE OF CORRECTION

PATENT NO. : 7,068,395 B1  Page 1 of 1
APPLICATION NO. : 09/576928
DATED : June 27, 2006
INVENTOR(S) : Hiroshi Tanioka et al.

It is certified that error appears in the above-identified patent and that said Letters Patent is hereby corrected as shown below:

COLUMN 2:
Line 17, "peripheral" should read -- a peripheral --.

COLUMN 3:
Line 14, "numeral" should read -- Reference numeral --; and
Line 50, "1.67 bits)" should read -- 1.67 bits). --.

COLUMN 4:
Line 1, "shows" should read -- showing --.

COLUMN 5:
Line 33, "AO" should read -- A0 --.

COLUMN 6:
Line 67, "NOS" should read -- OS --.

COLUMN 7:
Line 66, "more large" should read --a larger--.

COLUMN 8:
Line 60, "small" should read -- small, --; and
Line 62, "more large" should read --a larger--.

COLUMN 10:
Line 25, "more large" should read --a larger--.

Signed and Sealed this

Twenty-sixth Day of June, 2007

JON W. DUDAS
*Director of the United States Patent and Trademark Office*